US012763364B2

(12) United States Patent
Ryu et al.

(10) Patent No.: US 12,763,364 B2
(45) Date of Patent: Oct. 13, 2026

(54) ADDITIVE, ELECTROLYTE FOR LITHIUM SECONDARY BATTERY COMPRISING SAME, AND LITHIUM SECONDARY BATTERY

(71) Applicant: SAMSUNG SDI CO., LTD., Yongin-si (KR)

(72) Inventors: Suyeol Ryu, Yongin-si (KR); Sanghoon Kim, Yongin-si (KR); Soojin Kim, Yongin-si (KR); Wonseok Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1156 days.

(21) Appl. No.: 17/771,623

(22) PCT Filed: Dec. 7, 2020

(86) PCT No.: PCT/KR2020/017722
§ 371 (c)(1),
(2) Date: Apr. 25, 2022

(87) PCT Pub. No.: WO2021/149910
PCT Pub. Date: Jul. 29, 2021

(65) Prior Publication Data

US 2023/0027225 A1 Jan. 26, 2023

(30) Foreign Application Priority Data

Jan. 23, 2020 (KR) ........................ 10-2020-0009542

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ......... H01M 10/0567; H01M 10/0569; H01M 4/382; H01M 4/505; H01M 4/525; H01M 2300/0025
See application file for complete search history.

(56) References Cited

U.S. PATENT DOCUMENTS

| | | | |
|---|---|---|---|
| 2,995,542 | A | 8/1961 | Brown |
| 2004/0214091 | A1 | 10/2004 | Lim et al. |

(Continued)

FOREIGN PATENT DOCUMENTS

| | | | |
|---|---|---|---|
| CN | 110635167 A | 12/2019 | |
| JP | 2001-345120 A | 12/2001 | |

(Continued)

OTHER PUBLICATIONS

International Search Report dated Mar. 12, 2021 for PCT/KR2020/017722.

(Continued)

*Primary Examiner* — Matthew T Martin
*Assistant Examiner* — Ankith R Sripathi
(74) *Attorney, Agent, or Firm* — Lee IP Law, P.C.

(57) ABSTRACT

Provided are an additive represented by Chemical Formula 1, an electrolyte for a lithium secondary battery including same, and a lithium secondary battery. The details of Chemical Formula 1 are as described in the specification.

12 Claims, 5 Drawing Sheets

(51) Int. Cl.

| | |
|---|---|
| ***H01M 4/505*** | (2010.01) |
| ***H01M 4/525*** | (2010.01) |
| ***H01M 10/0525*** | (2010.01) |

(52) U.S. Cl.
CPC .. *H01M 10/0525* (2013.01); *H01M 2004/028* (2013.01); *H01M 2300/0025* (2013.01)

(56) References Cited

U.S. PATENT DOCUMENTS

| | | | |
|---|---|---|---|
| 2011/0008680 | A1 | 1/2011 | Muldoon et al. |
| 2013/0337317 | A1 | 12/2013 | Shima et al. |
| 2014/0272600 | A1 | 9/2014 | Bouchet et al. |
| 2016/0172708 | A1 | 6/2016 | Porta Garcia et al. |
| 2019/0288337 | A1 | 9/2019 | Choi et al. |
| 2019/0326633 | A1 | 10/2019 | Yi et al. |

FOREIGN PATENT DOCUMENTS

| | | | |
|---|---|---|---|
| JP | 5480376 | B2 | 4/2014 |
| JP | 5880124 | B2 | 3/2016 |
| JP | 2016-531389 | A | 10/2016 |
| JP | 6201363 | B2 | 9/2017 |
| KR | 10-2004-0095853 | A | 11/2004 |
| KR | 10-2005-0090878 | A | 9/2005 |
| KR | 10-2019-0109099 | A | 9/2019 |

OTHER PUBLICATIONS

Chinese Office action dated Feb. 25, 2025.
Chinese Notice of Allowance dated Jun. 20, 2025.

ADDITIVE, ELECTROLYTE FOR LITHIUM SECONDARY BATTERY COMPRISING SAME, AND LITHIUM SECONDARY BATTERY

CROSS REFERENCE TO RELATED APPLICATIONS

This is the U.S. national phase application based on PCT Application No. PCT/KR2020/017722, filed Dec. 7, 2020, which is based on Korean Patent Application No. 10-2020-0009542, filed Jan. 23, 2020, the entire contents of all of which are hereby incorporated by reference.

TECHNICAL FIELD

An additive, an electrolyte for a lithium secondary battery including the same, and a lithium secondary battery are disclosed.

BACKGROUND ART

A lithium secondary battery may be recharged and has three or more times as high energy density per unit weight as a conventional lead storage battery, nickel-cadmium battery, nickel hydrogen battery, nickel zinc battery, and the like and may be also charged at a high rate and thus, is commercially manufactured for a laptop, a cell phone, an electric tool, an electric bike, and the like, and researches on improvement of additional energy density have been actively made.

Such a lithium secondary battery is manufactured by injecting an electrolyte into a battery cell, which includes a positive electrode including a positive active material capable of intercalating/deintercalating lithium ions and a negative electrode including a negative active material capable of intercalating/deintercalating lithium ions.

$LiPF_6$ that is most commonly used as a lithium salt of an electrolyte has a problem of reacting with an electrolytic solvent to promote depletion of a solvent and generate a large amount of gas.

$LiPF_6$ that is most commonly used as a lithium salt of an electrolyte has a problem of reacting with an electrolytic solvent to promote depletion of a solvent and generate a large amount of gas. When $LiPF_6$ is decomposed, it generates LiF and $PF_5$, which leads to electrolyte depletion in the battery, resulting in degradation in high-temperature performance and poor safety.

There are needs for an electrolyte which suppresses side reactions of such a lithium salt and improves the performance of the battery.

DISCLOSURE

Technical Problem

An embodiment provides an additive capable of improving battery performance by ensuring high-temperature stability.

Another embodiment provides an electrolyte for a lithium secondary battery including the additive.

Another embodiment provides a lithium secondary battery including the electrolyte for a lithium secondary battery.

Technical Solution

An embodiment of the present invention provides an additive represented by Chemical Formula 1.

[Chemical Formula 1]

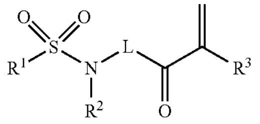

In Chemical Formula 1,

L is a single bond, $C_n(R^a)_{2n}$—O—$C_m(R^b)_{2m}$, or a C1 to C10 alkylene group, $R^a$ and $R^b$ are each independently hydrogen, a substituted or unsubstituted C1 to C5 alkyl group, or a substituted or unsubstituted C3 to C10 cycloalkyl group, and n and m are each independently an integer of 0 to 3.

$R^1$ and $R^2$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, or a substituted or unsubstituted C6 to C20 aryl group, and $R^3$ is a substituted or unsubstituted C1 to C10 alkyl group.

For example, Chemical Formula 1 may be represented by Chemical Formula 1A.

[Chemical Formula 1A]

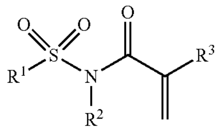

In Chemical Formula 1A, definitions of $R^1$ to $R^3$ are the same as described above.

For example, in Chemical Formula 1, $R^1$ may be a substituted or unsubstituted C1 to C10 alkyl group, a substituted or unsubstituted C2 to C10 alkenyl group, or a substituted or unsubstituted C2 to C10 alkynyl group, and $R^3$ may be a substituted or unsubstituted C1 to C5 alkyl group.

For example, in Chemical Formula 1, $R^1$ to $R^3$ may each independently be a substituted or unsubstituted C1 to C10 alkyl group.

Another embodiment of the present invention provides an electrolyte for a lithium secondary battery including a non-aqueous organic solvent, a lithium salt, and the aforementioned additive.

The additive may be included in an amount of 0.05 wt % to 5.0 wt % based on the total weight of the electrolyte for a lithium secondary battery.

The additive may be included in an amount of 0.1 wt % to 3.0 wt % based on the total weight of the electrolyte for a lithium secondary battery.

Another embodiment of the present invention provides a lithium secondary battery including a positive electrode including a positive active material; a negative electrode including a negative active material; and the aforementioned electrolyte.

The positive active material may be represented by Chemical Formula 4.

$$Li_{x1}M^1_{1-y1-z1}M^2_{y1}M^3_{z1}O_2 \quad \text{[Chemical Formula 4]}$$

In Chemical Formula 4, $0.9 \leq x1 \leq 1.8$, $0 \leq y1 \leq 1$, $0 \leq z1 \leq 1$, $0 \leq y1+z1 < 1$, $M^1$, $M^2$, and $M^3$ are each independently selected from Ni, Co, Mn, Al, Sr, Mg, La, and a combination thereof.

The positive active material may be represented by Chemical Formula 5.

$Li_{x2}Ni_{y2}Co_{z2}Al_{1-y2-z2}O_2$ [Chemical Formula 5]

In Chemical Formula 5, $1 \leq x2 \leq 1.2$, $0.6 \leq y2 \leq 1$, and $0 \leq z2 \leq 0.5$.

Advantageous Effects

A lithium secondary battery with improved high-temperature stability and cycle-life characteristics may be implemented.

DESCRIPTION OF SYMBOLS

Figure 1:
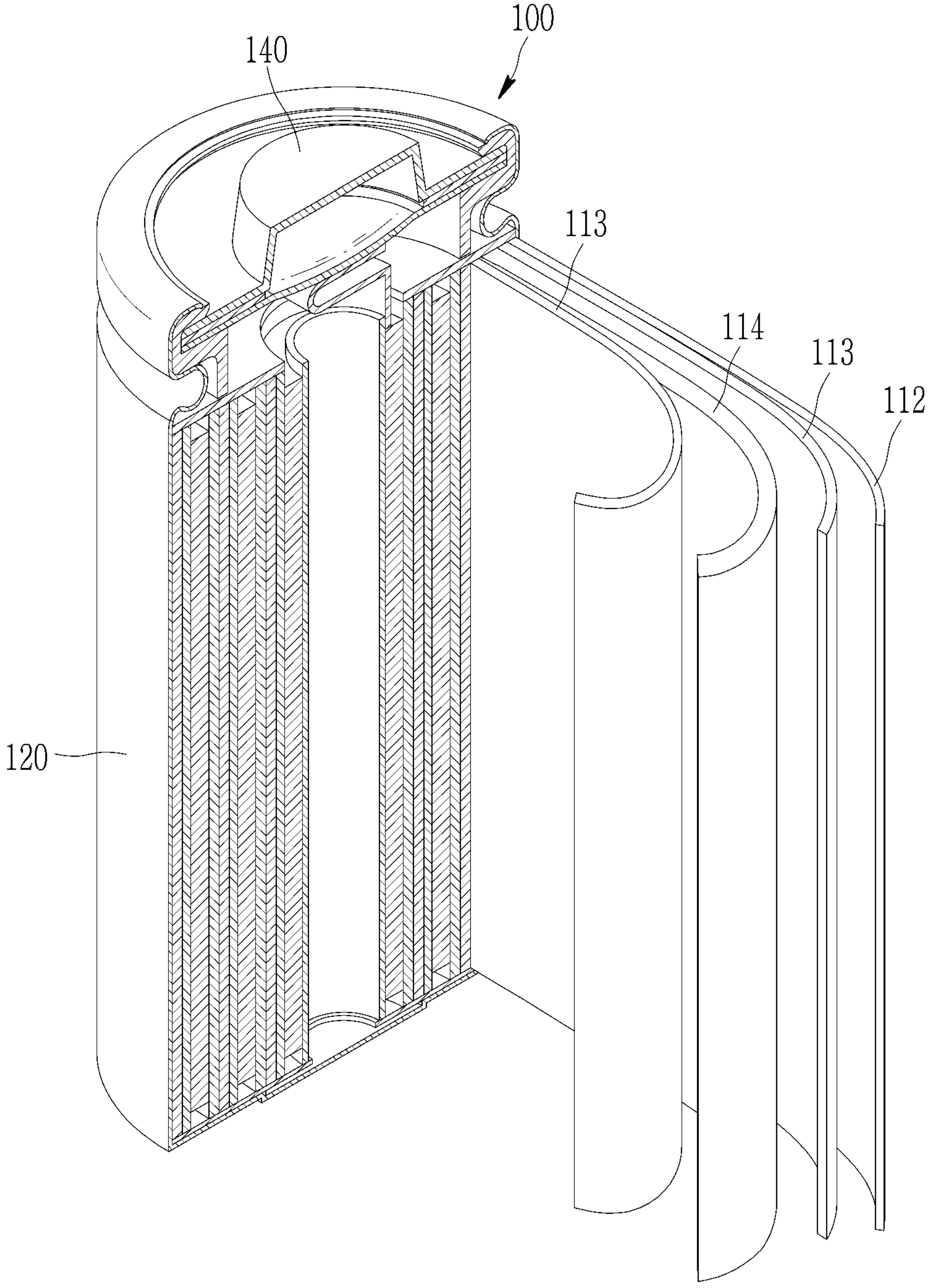
FIG. 1 is a schematic view illustrating a lithium secondary battery according to an embodiment of the present invention.

100: lithium secondary battery
112: negative electrode
113: separator
114: positive electrode
120: battery case
140: sealing member

BEST MODE

Hereinafter, embodiments of the present invention are described in detail. However, these embodiments are exemplary, the present invention is not limited thereto and the present invention is defined by the scope of claims.

In the present specification, when a definition is not otherwise provided, "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C 1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an additive according to an embodiment is described.

The additive according to an embodiment of the present invention is represented by Chemical Formula 1.

[Chemical Formula 1]

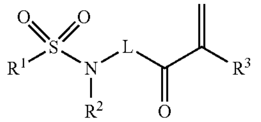

In Chemical Formula 1,

L is a single bond, $C_n(R^a)_{2n}$—O—$C_m(R^b)_{2m}$, or a C1 to C10 alkylene group, $R^a$ and $R^b$ are each independently hydrogen, a substituted or unsubstituted C1 to C5 alkyl group, or a substituted or unsubstituted C3 to C10 cycloalkyl group, and n and m are each independently an integer of 0 to 3.

$R^1$ and $R^2$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, or a substituted or unsubstituted C6 to C20 aryl group, and $R^3$ is a substituted or unsubstituted C1 to C10 alkyl group.

The additive represented by Chemical Formula 1 includes a sulfone functional group (—$SO_2$—) and a (meth)acryloyl group in one molecule.

They are decomposed into lithium salts in the electrolyte to form a solid electrolyte interface (SEI) film with strong and excellent ion conductivity on the surface of the negative electrode, thereby suppressing decomposition of the surface of the negative electrode that may occur during high-temperature cycle operation and preventing an oxidation reaction of the electrolyte.

Specifically, due to the (meth)acryloyl group, the compound has an increased self-reduction voltage and is easily reduced and decomposed under a higher starting voltage than before and thus exhibits high reactivity with the negative electrode. Accordingly, the compound may be decomposed during the initial charge and thus form SEI (solid electrolyte interface) having excellent ion conductivity as well as being strong on the surface of the negative electrode and thereby suppress decomposition of the negative electrode surface and prevent oxidation of the electrolyte and resultantly, decrease a resistance increase rate in a lithium secondary battery.

In addition, by forming stable CEI (cathode-electrolyte interphases) on the initial surface of the positive electrode, stable high-temperature storage characteristics and cycle-life characteristics for a long period of time may be secured.

For example, Chemical Formula 1 may be represented by Chemical Formula 1A.

[Chemical Formula 1A]

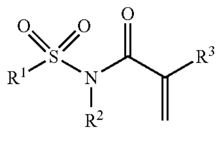

In Chemical Formula 1A, definitions of $R^1$ to $R^3$ are the same as described above.

As shown in Chemical Formula 1A, when L is a single bond and a sulfonamide group and a (meth)acryloyl group are directly linked to each other, an effect of improving the formation efficiency and initial resistance is more improved.

For example, in Chemical Formula 1, $R^1$ may be a substituted or unsubstituted C1 to C10 alkyl group, a substituted or unsubstituted C2 to C10 alkenyl group, or a substituted or unsubstituted C2 to C10 alkynyl group, and $R^3$ may be a substituted or unsubstituted C1 to C5 alkyl group.

For example, in Chemical Formula 1, $R^1$ to $R^3$ may each independently be a substituted or unsubstituted C1 to C10 alkyl group.

In the most specific embodiment, $R^1$ to $R^3$ of Chemical Formula 1 may each independently be a methyl group, an ethyl group, an n-propyl group, or an iso-propyl group, but are not limited thereto.

The electrolyte for a lithium secondary battery according to another embodiment of the present invention includes a non-aqueous organic solvent, a lithium salt, and the aforementioned additive.

The additive may be included in an amount of 0.05 wt % to 5.0 wt %, or specifically, 0.1 wt % to 3.0 wt %, based on the total weight of the electrolyte for a lithium secondary battery.

When the amount range of the additive is as described above, a lithium secondary battery with improved cycle-life characteristics may be implemented by preventing an increase in resistance at high temperatures.

That is, when the amount of the additive represented by Chemical Formula 1 is less than 0.05 wt %, high-temperature storage characteristics may be lowered, and when it exceeds 5.0 wt %, cycle-life may be decreased due to an increase in interfacial resistance.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may be methyl acetate, ethyl acetate, n-propyl acetate, dimethyl acetate, methyl propionate, ethyl propionate, propyl propionate, decanolide, mevalonolactone, caprolactone, and the like. The ether-based solvent may be dibutyl ether, tetraglyme, diglyme, dimethoxyethane, 2-methyltetrahydrofuran, tetrahydrofuran, and the like. In addition, the ketone-based solvent may be cyclohexanone, and the like. In addition, the alcohol-based solvent may be ethyl alcohol, isopropyl alcohol, and the like and the aprotic solvent may be nitriles such as R—CN (R is a C2 to C20 linear, branched, or cyclic hydrocarbon group and may include a double bond aromatic ring, or an ether bond), amides such as dimethylformamide, dioxolanes such as 1,3-dioxolane, sulfolanes, and the like.

The non-aqueous organic solvent may be used alone or in a mixture. When the organic solvent is used in a mixture, the mixture ratio may be controlled in accordance with a desirable battery performance.

The carbonate-based solvent is prepared by mixing a cyclic carbonate and a chain carbonate. In this case, when the cyclic carbonate and the chain carbonate are mixed in a volume ratio of 1:1 to 1:9, the performance of the electrolyte may be improved.

The non-aqueous organic solvent may further include an aromatic hydrocarbon-based organic solvent in the carbonate-based solvent. In this case, the carbonate-based solvent and the aromatic hydrocarbon-based solvent may be mixed in a volume ratio of 1:1 to 30:1.

As the aromatic hydrocarbon-based solvent, an aromatic hydrocarbon-based compound represented by Chemical Formula 2 may be used.

[Chemical Formula 2]

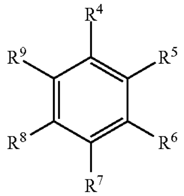

In Chemical Formula 2, $R^4$ to $R^9$ are the same or different and are selected from hydrogen, a halogen, a C1 to C10 alkyl group, a haloalkyl group, and a combination thereof.

Specific examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene-based carbonate-based compound represented by Chemical Formula 3 as a cycle-life improving additive in order to improve battery cycle-life.

[Chemical Formula 3]

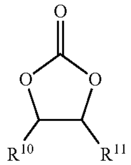

In Chemical Formula 3, $R^{10}$ and $R^{11}$ are the same or different, and selected from hydrogen, a halogen, a cyano group (CN), a nitro group ($NO_2$), and a fluorinated C1 to C5 alkyl group provided that at least one of $R^{10}$ and $R^{11}$ is a halogen, a cyano group (CN), a nitro group ($NO_2$), and a fluorinated C1 to C5 alkyl group, and both of $R^{13}$ and $R^{14}$ are not hydrogen.

Examples of the ethylene-based carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate.

The amount of the additive for improving cycle-life may be used within an appropriate range.

The lithium salt is dissolved in a non-aqueous organic solvent, supplies a battery with lithium ions, basically operates the lithium secondary battery, and improves transportation of the lithium ions between positive and negative electrodes. Examples of the lithium salt include one or more selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer of 1 to 20, LiCl, LiCl, LiI, and $LiB(C_2O_4)_2$ (lithium bis (oxalato) borate: LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment of the present invention provides a lithium secondary battery including a positive electrode including a positive active material; a negative electrode including a negative active material; and the aforementioned electrolyte.

The positive electrode may include a current collector and a positive active material layer including a positive active material which is formed on the current collector.

The positive active material may include lithiated intercalation compounds that reversibly intercalate and deintercalate lithium ions.

Specifically, at least one composite oxide of lithium and a metal of cobalt, manganese, nickel, and a combination thereof may be used.

Specific examples thereof may be a compound represented by one of chemical formulas.

$Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha < 2$); $Li_aNi_{1-b-c}Mn_bX_{2-\alpha}T_\alpha\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$)

In chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The positive active material may include the positive active material with the coating layer, or a compound of the positive active material and the positive active material coated with the coating layer. The coating layer may include a coating element compound of an oxide or hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes as long as it does not cause any side effects on the properties of the positive active material (e.g., spray coating, dipping), which is a content that can be well understood by those engaged in the relevant field and thus a detailed description will be omitted.

A specific example of the positive active material may include a compound represented by Chemical Formula 4.

$$Li_{x1}M^1_{1-y1-z1}M^2_{y1}M^3_{z1}O_2 \quad \text{[Chemical Formula 4]}$$

In Chemical Formula 4, $0.9 \le x1 \le 1.8$, $0 \le y1 \le 1$, $0 \le z1 \le 1$, $0 \le y1+z1 < 1$, and $M^1$, $M^2$, and $M^3$ are each independently any one selected from Ni, Co, Mn, Al, Sr, Mg, La, and a combination thereof.

For example, the positive active material may be one or more of a composite oxide of lithium and a metal selected from cobalt, manganese, nickel, aluminum, and combinations thereof, and the most specific example of the positive active material according to an embodiment of the present invention may include a compound of Chemical Formula 5.

$$Li_{x2}Ni_{y2}Co_{z2}Al_{1-y2-z2}O_2 \quad \text{[Chemical Formula 5]}$$

In Chemical Formula 5, $1 \le x2 \le 1.2$, $0.6 \le y2 \le 1$, and $0 \le z2 \le 0.5$.

An amount of the positive active material may be 90 wt % to 98 wt % based on the total weight of the positive active material layer.

In an embodiment, the positive active material layer may include a binder and a conductive material. Herein, each amount of the binder and conductive material may be 1 wt % to 5 wt % based on the total weight of the positive active material layer.

The binder improves binding properties of positive active material particles with one another and with a current collector examples thereof and may for example include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material is included to improve electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be Al, but is not limited thereto.

The negative electrode includes a current collector and a negative active material layer formed on the current collector.

The negative active material may be a material that reversibly intercalates/deintercalates lithium ions, a lithium metal, a lithium metal alloy, a material capable of doping and dedoping lithium, or a transition metal oxide.

The material that reversibly intercalates/deintercalates lithium ions includes carbon materials and the carbon material may be any generally-used carbon-based negative active material in a lithium ion secondary battery and examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, calcined coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material capable of doping and dedoping lithium may include Si, $SiO_x$ ($0<x<2$), a Si-Q alloy (wherein Q is selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, a Sn—R alloy (wherein R is an alkali metal, an alkaline-earth metal, a Group 13 element, a Group 14 element, a Group 15 element, a Group 16 element, a transition element, a rare earth element, or a combination thereof, and not Sn), and the like and at least one of them may be mixed with $SiO_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combination thereof.

The transition metal oxide may be a vanadium oxide, a lithium vanadium oxide, and the like.

In the negative active material layer, the negative active material may be included in an amount of 95 wt % to 99 wt % based on the total weight of the negative active material layer.

In an embodiment, the negative active material layer may include a binder, and optionally a conductive material. In the negative active material layer, the amount of the binder may be 1 wt % to 5 wt % based on the total weight of the negative active material layer. When it further includes the conductive material, it may include 90 wt % to 98 wt % of the negative active material, 1 wt % to 5 wt % of the binder, and 1 wt % to 5 wt % of the conductive material.

The binder improves binding properties of negative active material particles with one another and with a current collector. The binder may be a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, an ethylenepropylene copolymer, polyethyleneoxide, polyvinylpyrrolidone, polyepichlorohydrine, polyphosphazene, polyacrylonitrile, polystyrene, an ethylene propylenediene copolymer, polyvinylpyridine, chlorosulfonatedpolyethylene, latex, a polyester resin, an acrylic resin, a phenolic resin, an epoxy resin, polyvinylalcohol, and a combination thereof.

When the water-soluble binder is used as the negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of 0.1 to 3 parts by weight based on 100 parts by weight of the negative active material.

The conductive material is included to provide electrode conductivity and any electrically conductive material may be used as a conductive material unless it causes a chemical change. Examples thereof may be a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like, or a mixture thereof.

The current collector may be selected from a copper foil, a nickel foil, a stainless steel foil, a titanium foil, a nickel foam, a copper foam, a polymer substrate coated with a conductive metal, and a combination thereof.

A separator may be present between the positive electrode and the negative electrode depending on a type of the lithium secondary battery. Such a separator may include polyethylene, polypropylene, polyvinylidene fluoride, or a multilayer film of two or more layers thereof such as a polyethylene/polypropylene double-layered separator, a polyethylene/polypropylene/polyethylene triple-layered separator, and a polypropylene/polyethylene/polypropylene triple-layered separator.

Referring to FIG. 1, a lithium secondary battery 100 according to an embodiment includes a battery cell including a negative electrode 112, a positive electrode 114 facing the negative electrode 112, a separator 113 interposed between the negative electrode 112 and the positive electrode 114, and an electrolyte solution (not shown) impregnating the negative electrode 112, the positive electrode 114, and the separator 113, a battery case 120 configured to accommodate the battery cell, and a sealing member 140 sealing the battery case 120.

MODE FOR INVENTION

Hereinafter, examples of the present invention and comparative examples are described. These examples, however, are not in any sense to be interpreted as limiting the scope of the invention.

Manufacture of Lithium Secondary Battery Cells

Preparation Example 1: Synthesis of Additive Represented by Chemical Formula 1a

[Chemical Formula 1a]

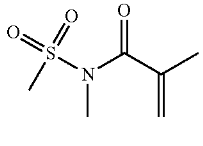

A compound of Chemical Formula 1a was obtained according to Scheme 1.

[Reaction Scheme 1]

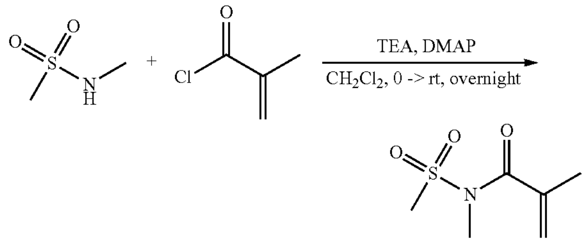

Under a nitrogen atmosphere, N-methylmethanesulfoneamide and methacryloyl chloride in an equivalent ratio of 1:1 were sufficiently dissolved in a dichloromethane solvent at 0° C. Subsequently, triethylamine and 4-dimethylaminopyridine in each small amount were slowly added to the mixed solution and sufficiently dissolved therein and then, stirred at room temperature for 12 hours. After a reaction, a solid produced therein was filtered, obtaining a compound represented by Chemical Formula 1a as white powder (a yield of 89%).

$^1$H NMR (400 MHz, $CDCl_3$): δ 5.45, 5.35, 3.27, 3.26, 2.01; $^{13}$C NMR: δ 172.8, 140.0, 119.2, 41.6, 34.4, 19.2.

Preparation Example 2: Synthesis of Additive Represented by Chemical Formula 2a

[Chemical Formula 2a]

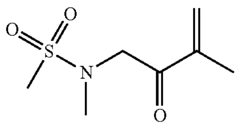

A compound represented by Chemical Formula 2a was prepared by changing the methacryloyl chloride to 1-chloro-3-methylbut-3-en-2-one in Preparation Example 1.

$^1$H NMR (400 MHz, $CDCl_3$): δ 6.03, 5.54, 4.56, 3.11, 2.98, 1.88; $^{13}$C NMR: δ 201.9, 144.0, 124.0, 61.5, 32.1, 27.1.

Preparation Example 3: Synthesis of Additive Represented by Chemical Formula 3a

[Chemical Formula 3a]

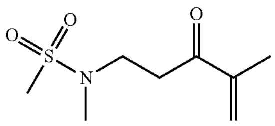

A compound represented by Chemical Formula 3a was prepared by changing the methacryloyl chloride to 5-chloro-2-methylpent-1-en-3-one in Preparation Example 1.

$^1$H NMR (400 MHz, $CDCl_3$): δ 5.99, 5.52, 3.69, 3.07, 3.07, 2.81, 1.83; $^{13}$C NMR: δ 201.9, 144.0, 124.0, 121.5, 55.0, 42.1, 39.0, 27.1, 21.1

Preparation Example 4: Synthesis of Additive Represented by Chemical Formula 4a

[Chemical Formula 4a]

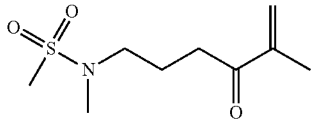

A compound represented by Chemical Formula 4a was prepared by changing the methacryloyl chloride to 6-chloro-2-methylhex-1-en-3-one in Preparation Example 1.

$^1$H NMR (400 MHz, $CDCl_3$): δ 5.99, 5.52, 3.43, 3.05, 2.98, 2.56, 1.90, 1.83; $^{13}$C NMR: δ 201.9, 144.0, 124.0, 121.5, 60.0, 42.1, 39.0, 27.1, 22.5, 21.1

Comparative Preparation Example 1: Synthesis of Additive Represented by Chemical Formula 1b

[Chemical Formula 4b]

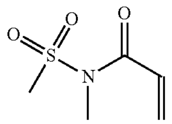

Under a nitrogen atmosphere, N-methylmethanesulfoneamide was dissolved in N,N-dimethylformamide to prepare a solution, and 2-propenoyl bromide and anhydrous potassium carbonate in an equivalent ratio of 1:1 were slowly added thereto and then, stirred at room temperature for 18 hours. After a reaction, a compound represented by Chemical Formula 1b in the form of a liquid was obtained by using a column.

Comparative Preparation Example 2: Synthesis of Additive Represented by Chemical Formula 1c

[Chemical Formula 1c]

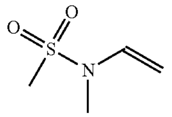

In Comparative Preparation Example 1, the 2-propenoyl bromide was changed to vinyl bromide, obtaining a compound represented by Chemical Formula 1c in the form of a liquid.

Comparative Preparation Example 3: Synthesis of Additive Represented by Chemical Formula 1d

[Chemical Formula 1d]

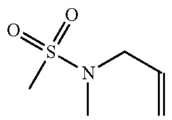

In Comparative Preparation Example 1, the 2-propenoyl bromide was changed to 3-bromo-1-propene, obtaining a compound represented by Chemical Formula 1d in the form of a liquid.

Example 1

$LiNi_{0.88}Co_{0.105}Al_{0.015}O_2$ as a positive active material, polyvinylidene fluoride as a binder, and carbon black as a conductive material were mixed respectively in a weight ratio of 98:1:1 and then, dispersed in N-methyl pyrrolidone to prepare positive active material slurry.

The positive active material slurry was coated on a 20 μm-thick Al foil, dried at 100° C., and pressed to manufacture a positive electrode.

Graphite as a negative active material, a styrene-butadiene rubber binder, and carboxylmethyl cellulose were mixed in a weight ratio of 98:1:1, and then, dispersed in N-methyl pyrrolidone to prepare negative active material slurry.

The negative active material slurry was coated on a 10 μm-thick Cu foil, dried at 100° C., and pressed to manufacture a negative electrode.

The manufactured positive and negative electrodes, a 25 μm-thick polyethylene separator, and an electrolyte solution were used to manufacture a lithium secondary battery cell.

A composition of the electrolyte is as follows.

(Composition of Electrolyte)

Salt: $LiPF_6$ 1.15 M

Solvent: ethylene carbonate: ethylmethyl carbonate: dim ethyl carbonate (EC:EMC:DMC=volume ratio of 2:4:4)

Additive: 0.5 wt % of a compound represented by Chemical Formula 1a (Herein, the composition of the electrolyte solution, "wt %" is based on the total amount (lithium salt+non-aqueous organic solvent+additive) of the electrolyte)

Example 2

A lithium secondary battery cell was manufactured in the same manner as Example 1 except that the amount of the additive was changed to 3.0 wt %.

Examples 3 to 5

Lithium secondary battery cells were manufactured in the same manner as Example 1 except that the compounds represented by Chemical Formulas 2a, 3a, and 4a were respectively used instead of the compound represented by Chemical Formula 1a as an additive.

Comparative Example 1

A lithium secondary battery cell was manufactured in the same manner as in Example 1, except that additives were not used.

Comparative Example 2

A lithium secondary battery cell was manufactured in the same manner as Example 1 except that the additive was changed to the compound represented by Chemical Formula 1b according to Comparative Preparation Example 1.

Comparative Example 3

A lithium secondary battery cell was manufactured in the same manner as Example 1 except that the additive was changed to the compound represented by Chemical Formula 1c according to Comparative Preparation Example 2.

Comparative Example 4

A lithium secondary battery cell was manufactured in the same manner as Example 1 except that the additive was changed to the compound represented by Chemical Formula 1 d according to Comparative Preparation Example 3.

Evaluation of Battery Cell Characteristics

Evaluation 1: Measurement of Reduction Voltage

The lithium secondary battery cell according to Example 1 was charged at 4.3 V and a 0.1 C rate and discharged to 3.5 V at the 0.1 C rate at 25° C. and then, measured with respect to potential (V) and discharge capacity (mAh) after the first cycle, and dQ/dV was calculated to determine a reduction potential.

Figure 2:
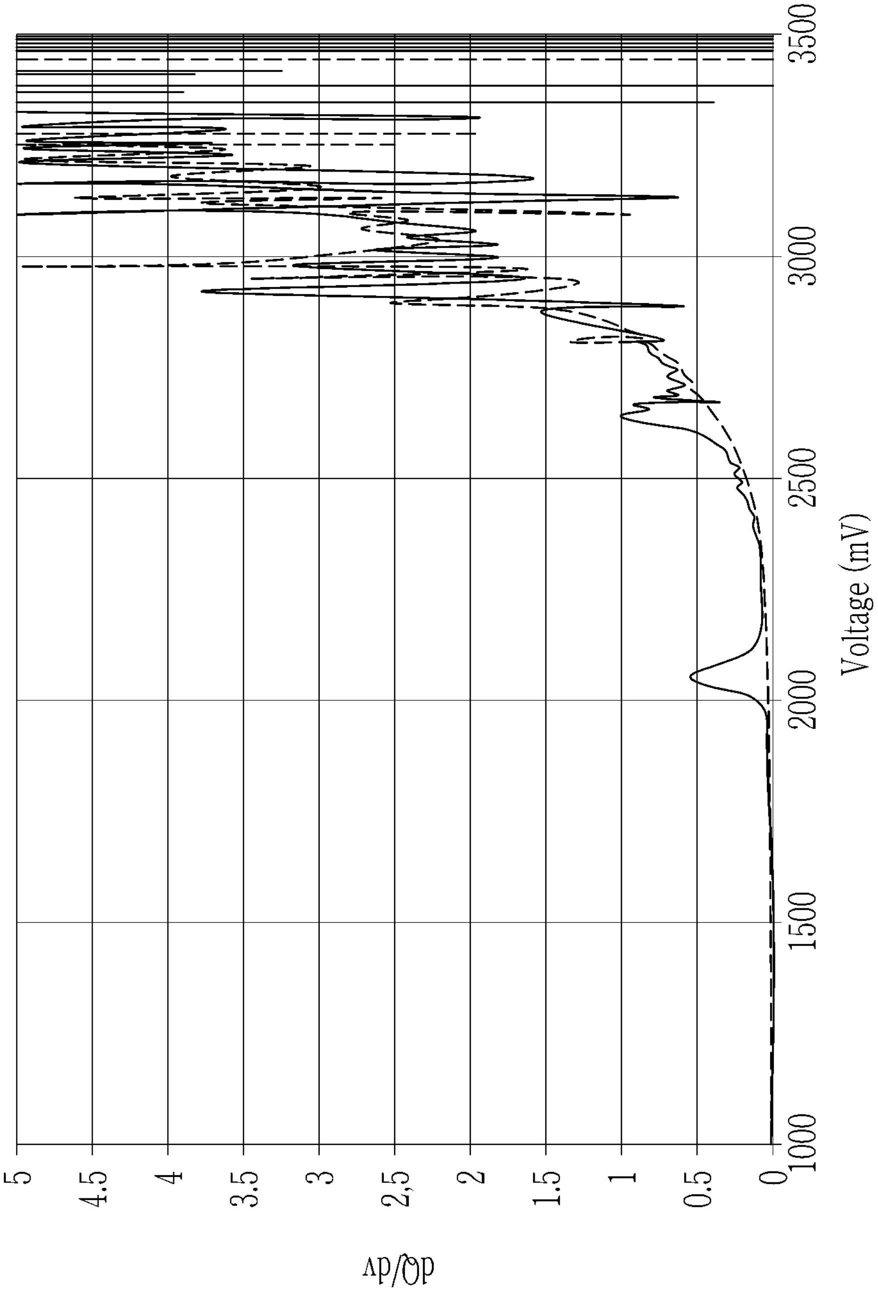
FIG. 2 is a graph showing dQ/dV results of the lithium secondary battery cell according to Example 1.

The aforementioned dQ/dV result graph is shown in FIG. 2.

FIG. 2 shows the dQ/dV result graph of the lithium secondary battery cell according to Example 1.

Referring to FIG. 2, reactivity of the lithium secondary battery cell according to Example 1 was confirmed within ranges of about 2.0 V to 2.2 V and about 2.5 V to 2.7 V, which shows that the additive according to an example embodiment was reduced and formed an SEI film.

Evaluation 2: Evaluation of CV Characteristics

Figure 3:
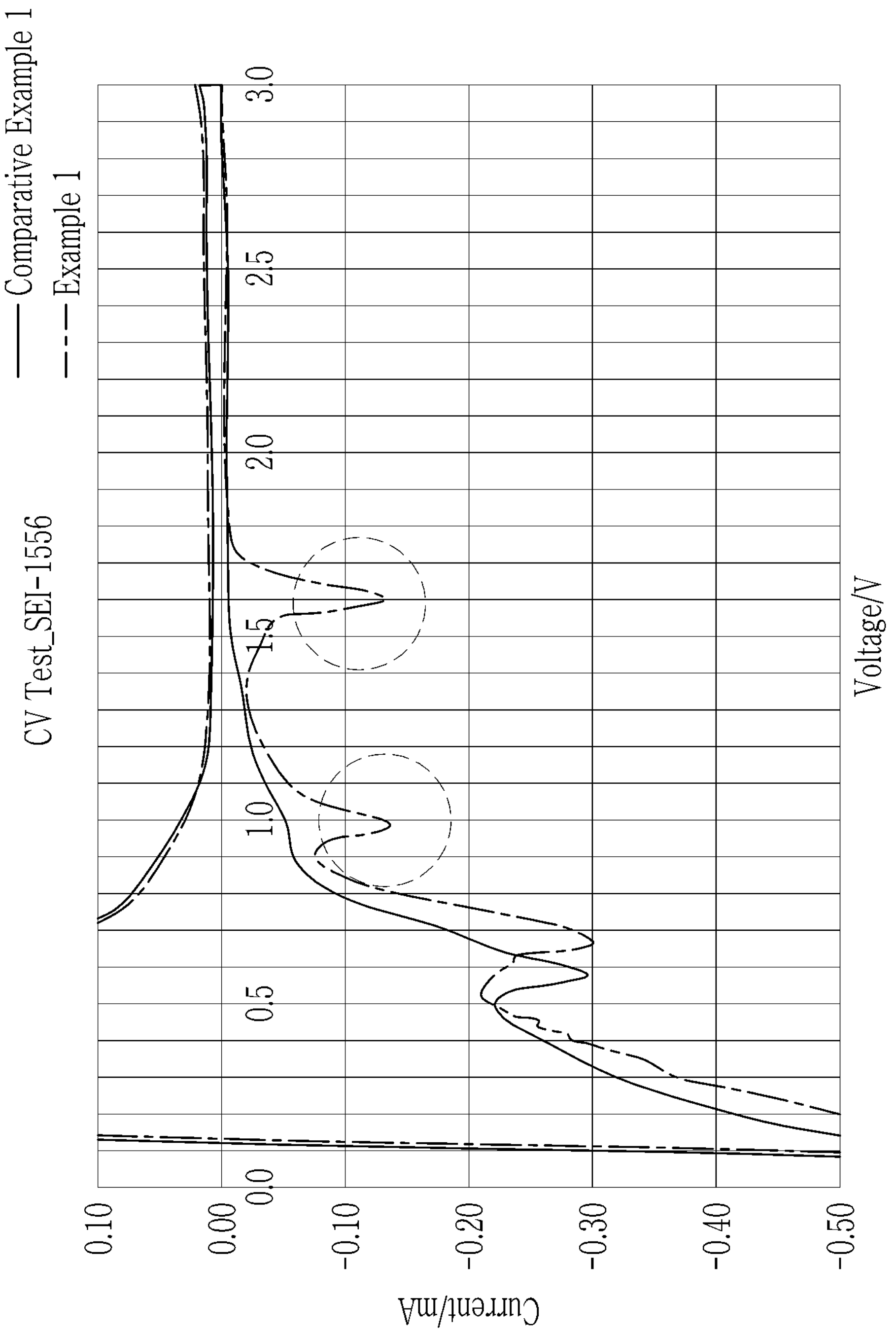
FIG. 3 is a graph showing the results of negative electrode cyclic voltammetry (CV) at room temperature of the electrolyte solutions according to Example 1 and Comparative Example 1.

In order to evaluate electrochemical stability of the electrolyte solutions according to Comparative Example 1 and Example 1, cyclic voltammetry (CV) was measured, and the results are shown in FIG. 3.

A three-electrode electrochemical cell using a graphite negative electrode as a working electrode and Li metal as a reference electrode and a counter electrode was used to measure negative electrode cyclic voltammetry (CV). Herein, scan was three cycles performed from 3 V to 0 V and from 0 V to 3 V at a scan speed of 0.1 mV/sec.

FIG. 3 is a graph showing the negative electrode cyclic voltammetry (CV) results at room temperature of the electrolyte solutions according to Example 1 and Comparative Example 1.

As shown in FIG. 3, the electrolyte solution of Example 1 including the additive according to the present invention exhibited a reduction decomposition peak around about 1.3 V to 1.6 V and about 0.9 V to 1.2 V.

On the contrary, the electrolyte solution including no additive according to Comparative Example 1 exhibited a reduction decomposition peak at a lower potential.

This proves that the electrolyte solution including the additive according to an example embodiment of the present invention interacted with a solvent at a relatively high reduction potential, and accordingly, the electrolyte solution according to Example 1 was expected to form an initial SEI film on the negative electrode over a wide voltage range before the solvent decomposition during the charge in which lithium ions were inserted into the negative electrode. According, compared with the lithium secondary battery cell adopting the electrolyte solution of Comparative Example 1 forming no initial SEI film, the lithium secondary battery cell adopting the electrolyte solution of Example 1 was expected to exhibit excellent battery performance.

Evaluation 3: Evaluation of High-Temperature Cycle-Life Characteristics

Figure 4:
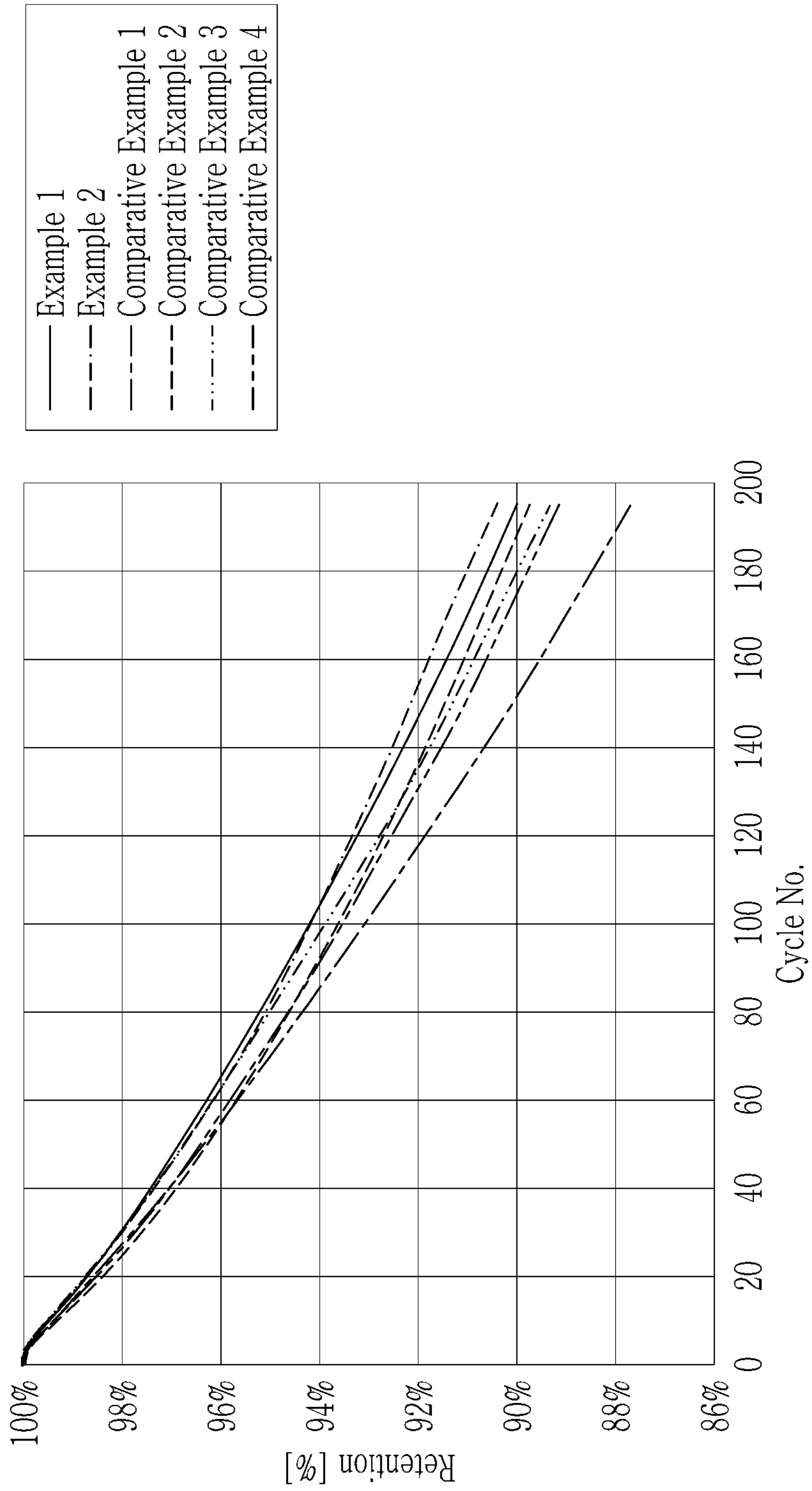
FIG. 4 is a graph showing cycle-life characteristics of lithium secondary battery cells according to Examples 1 and 2 and Comparative Examples 1 to 4 at a high temperature (45° C.).

The lithium secondary battery cells according to Examples 1 and 2 and Comparative Examples 1 to 4 were 200 times charged at a constant current-constant voltage under cut-off charge conditions of 0.5 C, 4.3 V, and 0.05 C and discharged at a constant current under discharge cut-off conditions of 0.5 C and 2.8 V at 45° C. and then, measured with respect to discharge capacity to calculate capacity retention of the discharge capacity at the 200$^{th}$ cycle relative to discharge capacity at the 1$^{st}$ cycle, and the results are shown in Table 1 and FIG. 4.

TABLE 1

| | Capacity retention (%, @ 200) |
|---|---|
| Example 1 | 90.0 |
| Example 2 | 90.5 |
| Comparative Example 1 | 87.7 |
| Comparative Example 2 | 89.8 |
| Comparative Example 3 | 89.3 |
| Comparative Example 4 | 89.1 |

FIG. 4 is a graph showing cycle-life characteristics of the lithium secondary battery cells according to Examples 1 and 2 and Comparative Examples 1 to 4 at a high temperature (45° C.).

Referring to FIG. 4, Examples 1 and 2 including the additive according to the present invention exhibited excellent high-temperature cycle characteristics, compared with Comparative Example 1 including no additive and Comparative Example 2 to 4 including other types of additives.

Evaluation 4: Evaluation of High-Temperature Storage Characteristics

Figure 5:
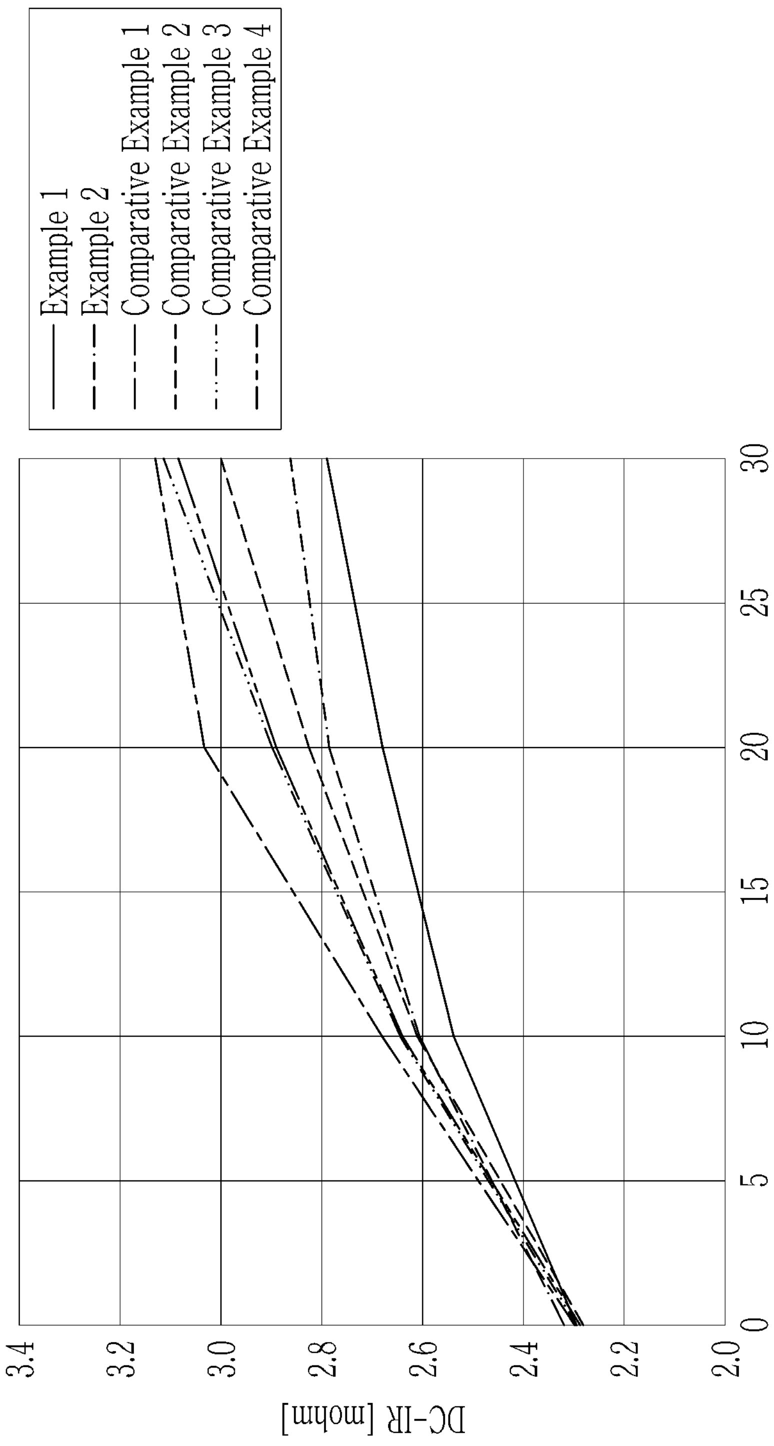
FIG. 5 is a graph showing an internal resistance increase rate of lithium secondary battery cells according to Examples 1 and 2 and Comparative Examples 1 to 4 when allowed to stand at a high temperature (60° C.).

Each lithium secondary battery cell according to Examples 1 and 2 and Comparative Example 1 to 4 was allowed to stand at 60° C. in a state of charge (SOC=100%) for 30 days and then, evaluated with respect to an internal resistance increase rate when allowed to stand at a high temperature (60° C.), and the results are shown in Table 2 and FIG. 5.

DC-IR was measured in the following method.

The cells according to Examples 1 and 2 and Comparative Example 1 to 4 were charged with 4 A and 4.3 V at room temperature (25° C.) and cut off at 100 mA and then, paused for 30 minutes. Subsequently, the cells were respectively charged with 10 A for 10 seconds, 1 A for 10 seconds, and 10 A for 4 seconds and then, measured with respect to a current and a voltage at 18 seconds and 23 seconds, and then, initial resistance (difference between resistance at the 18 seconds and resistance at the 23 seconds) was calculated according to$\Delta R=\Delta V/\Delta I$.

The cells were allowed to stand under charge condition of 0.2 C and 4.3 V at 60° C. for 30 days and measured with respect to DC-IR, and the results are shown in FIG. 5, and resistance increase rates thereof before and after being allowed to stand were calculated, and the results are shown in Table 2.

Resistance increase rate (%)=[(DC-IR after being allowed to stand for 30 days−DC-IR before being allowed to stand)/DC-IR before being allowed to stand]×100 <Equation 1>

TABLE 2

| | Initial DC-IR (mOhm) | DC-IR (mOhm) 60° C. @30 days | ΔDC-IR (%) |
|---|---|---|---|
| Example 1 | 2.29 | 2.79 | 21.8 |
| Example 2 | 2.32 | 2.86 | 23.3 |
| Comparative Example 1 | 2.30 | 3.13 | 36.1 |
| Comparative Example 2 | 2.29 | 3.00 | 31.0 |
| Comparative Example 3 | 2.30 | 3.11 | 35.2 |
| Comparative Example 4 | 2.30 | 3.08 | 33.9 |

FIG. 5 is a graph showing an internal resistance increase rate of lithium secondary battery cells according to Examples 1 and 2 and Comparative Examples 1 to 4 when allowed to stand at a high temperature (60° C.).

Referring to FIG. 5 and Table 2, the cells of Examples 1 and 2 exhibited decreased resistance increase rates before and after being allowed to stand compared with Comparative Examples 1 to 4. Accordingly, the cells of Examples 1 and 2 exhibited improved high temperature stability, compared with the cells of Comparative Examples 1 to 4.

Evaluation 5: Evaluation of Formation Efficiency

Initial resistances of Examples 1, Examples 3 to 5, and Comparative Examples 1 to 4 were calculated in the same manner as in the Evaluation 4 and then, provided in Table 3.

Formation efficiency was evaluated by respectively once performing charge and discharge at a constant current-constant voltage under cut-off charge conditions of 0.2 C, 4.3 V, and 0.02 C and at a constant current under cut-off discharge conditions of 0.2 C and 2.8 V at 25° C. after the formation, and then, a ratio of discharge capacity relative to charge capacity was calculated, and the results are shown in Table 3.

TABLE 3

| | Formation efficiency (%) | Initial resistance (mOhm) |
|---|---|---|
| Example 1 | 83.0 | 2.29 |
| Example 3 | 82.9 | 2.29 |
| Example 4 | 82.8 | 2.30 |
| Example 5 | 82.8 | 2.30 |
| Comparative Example 1 | 81.5 | 2.40 |
| Comparative Example 2 | 81.5 | 2.39 |
| Comparative Example 3 | 81.7 | 2.40 |
| Comparative Example 4 | 81.5 | 2.40 |

Referring to Table 3, the cells of Example 1 and Examples 3 to 5 included the additive within the present invention range and thus exhibited reduced initial resistance and improved formation efficiency, compared with the cells of Comparative Examples 1 to 4.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. An additive represented by Chemical Formula 1:

[Chemical Formula 1]

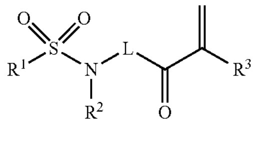

wherein, in Chemical Formula 1,

L is a single bond or a C1 to C10 alkylene group, $R^1$ and $R^2$ are each independently a substituted or unsubstituted C1 to C10 alkyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, or a substituted or unsubstituted C6 to C20 aryl group, and $R^3$ is a substituted or unsubstituted C1 to C10 alkyl group, wherein "substituted" refers to replacement of hydrogen of a compound by a substituent selected from a halogen atom (F, Br, Cl, or I), a hydroxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

2. The additive of claim 1, wherein Chemical Formula 1 is represented by Chemical Formula 1A:

[Chemical Formula 1A]

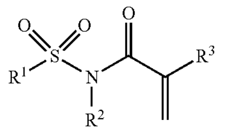

wherein, in Chemical Formula 1A, $R^1$ to $R^3$ are defined the same as those of Chemical Formula 1.

3. The additive of claim 1, wherein, in Chemical Formula 1, $R^1$ is a substituted or unsubstituted C1 to C10 alkyl group, a substituted or unsubstituted C2 to C10 alkenyl group, or a substituted or unsubstituted C2 to C10 alkynyl group, and $R^3$ is a substituted or unsubstituted C1 to C5 alkyl group.

4. The additive of claim 1, wherein in Chemical Formula 1, $R^1$ to $R^3$ are each independently a substituted or unsubstituted C1 to C10 alkyl group.

5. An electrolyte for a lithium secondary battery, the additive comprising:

a non-aqueous organic solvent, a lithium salt, and the additive of claim 1.

6. The electrolyte for a lithium secondary battery of claim 5, wherein the additive is included in an amount of 0.05 wt % to 5.0 wt % based on the total weight of the electrolyte for a lithium secondary battery.

7. The electrolyte for a lithium secondary battery of claim 5, wherein the additive is included in an amount of 0.1 wt % to 3.0 wt % based on the total weight of the electrolyte for a lithium secondary battery.

8. A lithium secondary battery, comprising a positive electrode including a positive active material;

a negative electrode including a negative active material; and the electrolyte of claim 5.

9. The lithium secondary battery of claim 8, wherein the positive active material is represented by Chemical Formula 4:

$$Li_{x1}M^1_{1-y1-z1}M^2_{y1}M^3_{z1}O_2 \quad \text{[Chemical Formula 4]}$$

wherein, in Chemical Formula 4, $0.9 \le x1 \le 1.8$, $0 \le y1 \le 1$, $0 \le z1 \le 1$, $0 \le y1+z1 < 1$, and $M^1$, $M^2$, and $M^3$ are each independently selected from Ni, Co, Mn, Al, Sr, Mg, La, and a combination thereof.

10. The lithium secondary battery of claim 8, wherein the positive active material is represented by Chemical Formula 5:

$$Li_{x2}Ni_{y2}Co_{z2}Al_{1-y2-z2}O_2 \quad \text{[Chemical Formula 5]}$$

wherein, in Chemical Formula 5, $1 \le x2 \le 1.2$, $0.6 \le y2 \le 1$, and $0 \le z2 \le 0.5$.

11. The additive of claim 1, wherein, in Chemical Formula 1, L is a C1 to C10 alkylene group.

12. The additive of claim 1, wherein, in Chemical Formula 1, L is a C5 to C10 alkylene group.

* * * * *